United States Patent [19]

Podgorski

[11] Patent Number: 4,821,282

[45] Date of Patent: Apr. 11, 1989

[54] MIRROR ASSEMBLY FOR LASERS

[75] Inventor: Theodore J. Podgorski, Maplewood, Minn.

[73] Assignee: Honeywell Inc., Minneapolis, Minn.

[21] Appl. No.: 814,338

[22] Filed: Dec. 27, 1985

[51] Int. Cl.[4] ............................................... H01S 3/08
[52] U.S. Cl. ........................................ 372/99; 372/92; 356/350; 350/609
[58] Field of Search .................... 372/92, 99; 356/350; 350/164, 166, 609, 603, 641, 487, 606, 607; 427/93

[56] References Cited

U.S. PATENT DOCUMENTS

| | | | |
|---|---|---|---|
| 3,930,731 | 1/1976 | Andringa | 372/93 X |
| 3,996,461 | 12/1976 | Sulzbach et al. | 350/166 X |
| 4,190,364 | 2/1980 | Ljung et al. | 356/350 |
| 4,271,397 | 6/1981 | Stiles et al. | 372/33 |
| 4,281,930 | 8/1981 | Hutchings | 356/350 |
| 4,388,344 | 6/1983 | Shuskus et al. | 350/641 |
| 4,444,467 | 4/1984 | Shuskus et al. | 350/607 |
| 4,451,119 | 5/1984 | Meyers et al. | 350/609 |
| 4,519,708 | 5/1985 | Perlmutter et al. | 372/94 X |
| 4,623,228 | 11/1986 | Galasso et al. | 350/609 |
| 4,655,555 | 4/1987 | Mächler et al. | 350/432 |
| 4,676,643 | 6/1987 | Vescial | 356/350 |

OTHER PUBLICATIONS

Danielewicz et al., "Hybrid Metal Mesh-Dielectric Mirrors ... Lasers", Applied Optics, vol. 15, No. 3, pp. 761-767, Mar. 1976.

Choyke et al., "Sic, A New Material for Mirrors", Applied Optics, vol. 15, No. 9, pp. 2006-2007, Sep. 1976.

Primary Examiner—Eugene R. LaRoche
Assistant Examiner—Seung Ham
Attorney, Agent, or Firm—Robert A. Pajak

[57] ABSTRACT

A mirror chip and mirror assembly are disclosed for use with a laser, and specifically a ring laser angular rate sensor. The mirror chip includes a mirror material deposited upon a silicon wafer. The mirror assembly includes the silicon wafer bonded to a secondary supporting substrate. The mirror chip and supporting substrate are highly polished so that they may be bonded together by an optical contact bond.

12 Claims, 2 Drawing Sheets

MIRROR ASSEMBLY FOR LASERS

BACKGROUND OF THE INVENTION

This invention relates to a novel construction for ring laser angular rates sensors and more particularly to a construction of a mirror assembly for such sensors which is less costly to manufacture than prior art constructions.

After years of development, ring laser angular rate sensors, commonly referred to as ring laser gyros, have become commercially successful products. Today, most commercial ring laser angular rate sensors use a mechanically and thermally stable block construction and mechanical dither concepts taught in U.S. Pat. No. 3,390,606, issued to T. Podgorski, and U.S. Pat. Nos. 3,467,472 and 3,373,650, both of which were issued to J. Killpatrick.

These prior art ring laser angular rate sensors have proven highly satisfactory in operation. These prior art ring laser angular rate sensors, however, are costly to manufacture.

A key element of a ring laser angular sensor is the mirror assembly. The mirror assemblies, using prior art construction techniques, include a substrate which is usually of a material which is the same as that chosen for the laser block which contains a cavity filled with gas. The block and mirror substrates may be, for example, Cervit, Zerodur, Fused Silica, BK-7 glass, etc.

The mirror assembly substrates of the prior art have at least one highly polished surface. Multi-layer dielectric coatings are deposited directly on the highly polished substrate surface to form a mirror. Secondly, the highly polished substrate can be joined with a matching highly polished block in order to fix the mirror substrate assembly to the block by, what is referred to as, an optical contact technique. That is, the surfaces are so higly polished that when the substrate and block are pressed together, the substrate is fixed to the block without bonding agents.

As is well known to those skilled in the art, the mirrors are the critical components of a ring laser angular rate sensor. This is so since a poor mirror does not achieve superior reflectivity required by a laser angular rate sensor. Reflectivity of the mirror is normally desired to be 99.9%. Poor reflectivity results in scattering of the laser beams in the ring laser which in turn causes a degradation in rate sensor performance. In order to achieve superior reflectivity, the substrates require extreme measures to achieve an ultra-high polished surface before the coatings are deposited thereon. To achieve an ultra-high polished mirror substrate surface usually requires several days of abrasive polishing.

After the step of ultra-high polishing of the mirror substrate's surface, the multi-layer coatings are deposited. The final step in the mirror assembly process is a quality check. If the mirror assemblies fail the quality check, the polishing step and deposition step must be repeated. For these reasons, the mirror assemblies are very costly to produce.

SUMMARY OF THE INVENTION

An object of this invention is the provision of a novel construction for a ring laser mirror assembly which permits it to be inexpensively manufactured. Briefly, this invention contemplates a silicon wafer upon which a mirror coating is deposited thereon. The silicon wafer is then secured to a mirror substrate.

DETAILED DESCRIPTION OF THE INVENTION

Figure 1:
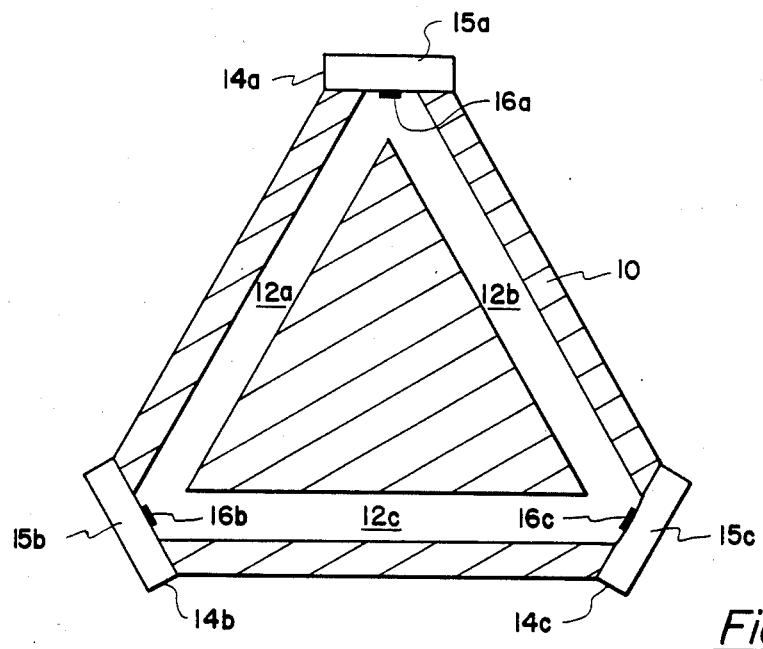
FIG. 1 is a plan view of a ring laser angular rate sensor.

FIG. 1 illustrates the components which comprise a ring laser angular rate sensor as specifically described by the aforementionedd U.S. patents. Briefly, a mechanically and thermally stable block 10 has tunnels 12a, 12b, and 12c bored therethrough to form a triangular lasing cavity. Mirror assemblies 14a, 14b, and 14c each include a mirror substrate 15a, 15b, and 15c, respectively, and mirror coatings 16a, 16b, and 16c, respectively. Each of the mirror assembly substrates 15a, 15b and 15c are secured to the block 10 by a variety of techniques including optical contact, indium seal, epoxy, and thermally formed seals (frit seal). In FIG. 1, substrate 15c is shown to have a large radius of curvature surface which is followed by mirror coating 16c.

As discussed earlier, in the prior art, mirror assembly substrates 15 are ultra-high polished before deposition of multi-layer dielectric coatings to provide mirrors 16. It should be noted that the polishing required before deposition of the dielectric coatings 16 on the miror substrates 15 is far beyond that which is necessary for securing the substrate 15 to block 10 by the optical contact technique. It should also be noted that deposition of the mutli-layer dielectric coatings on the substrates may be accomplished by a variety of techniques including, among others, e-beam and ion beam deposition techniques. Typically, the mirror coatings are comprised of alternate layers of silicon dioxide and titanium dioxide.

Figure 2:
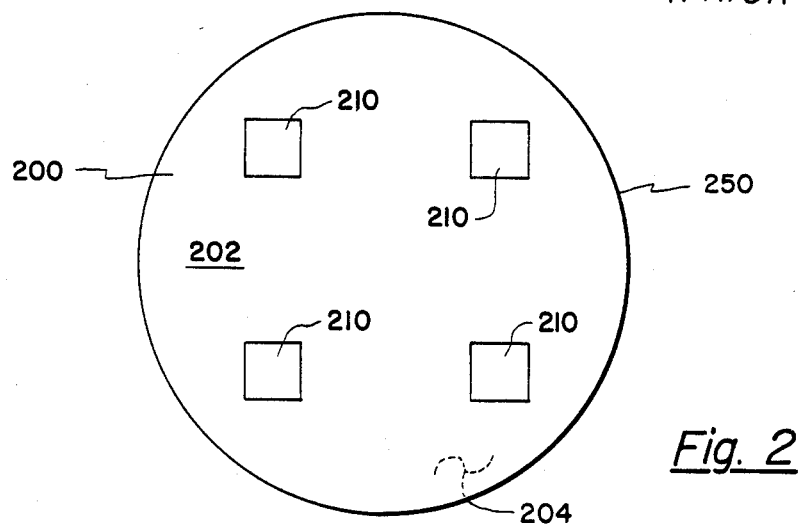
FIG. 2 illustrates a polished silicon wafer having multi-layer dielectric pattens deposited thereon.
Figure 3:
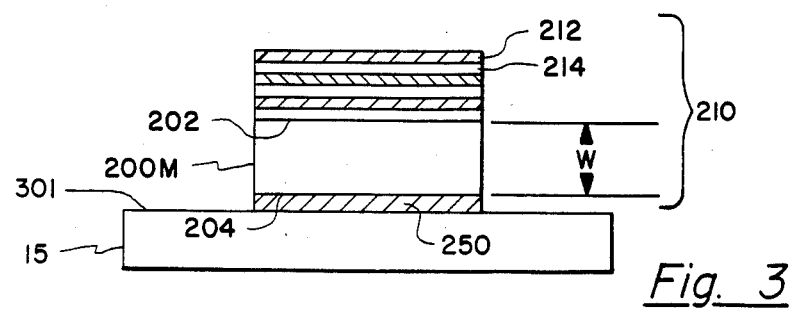
FIG. 3 illustrates a side view of a mirror chip.

Illustrated in FIGS. 2 and 3 is a mirror chip in accordance with the present invention. FIG. 2 illustrates a mirror chip substrate comprised of a very thin silicon wafer 200 having a finished thickness "W" in the order of 0.003–0.005 inches after polishing. The silicon wafer 200 is ultra-high polished on the shown surface 202. The back side of silicon wafer 202 identified as surface 204 is polished sufficient for providing an optical contact with block 10 as will be subsequently described. A highly reflective multi-layer dielectric coating, for example, alternate layers 212 and 214 of silicon dioxide and titanium dioxide, respectively, are deposited on surface 202. Deposition of the dielectric coatings on the silicon wafer may be accomplished by any of the well known semiconductor processing techniques. Further, the deposition of the multilayer dielectric coatings may be accomplished by other techniques including ion beam, e-beam, or the like. However, standard semiconductor deposition techniques are believed to achieve the lowest cost.

It should be noted that the mirror chip substrate may alternatively be comprised of other materials such as thin wafers of fused quartz, Zerodur, Cervit, and any other material which will serve the intended function. The chip need only be capable of allowing a mirror material to be deposited thereon. Further the mirror chip substrate may be comprised of a wafer material which may simply be polished to provide the mirror function. However, the state-of-the-art of silicon polishing makes a silicon wafer the preferred choice since silicon polishing may be in the order of ten times greater than that of other materials such as fused quartz, or the like.

Subsequent to the polishing of the wafer and deposition of the dielectric coating on the wafer, disc shaped mirror chips, as illustrated in FIG. 3, are cut out from wafer 200 by a variety of techniques including laser trimming or etching. The resulting disc shaped mirror chips are like that diagramatically illustrated in FIG. 3. Each chip includes a wafer portion 200M which form the mirror chip substrate.

In order to provide low cost mirror chips, silicon wafer 200 may be in the order of 3 to 4 inches in diameter and the mirror chips are in the order of 0.2 inches in diameter. Thus, a single wafer can produce many mirror chips on a single wafer. Many chips can be processed through each of the deposition process steps. Each of the mirror chips can then be quality checked before ever fixing the mirror chip substrate to a mirror assembly substrate and subsequent securing to a laser block.

Figure 4:
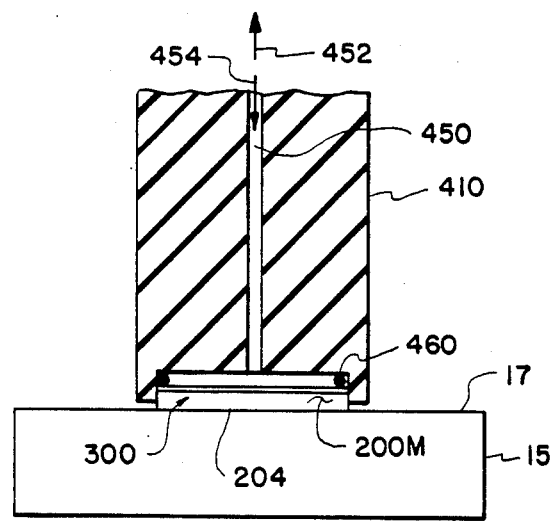
FIG. 4 illustrates a vacuum pump for handling of a mirror chip.

FIG. 4 illustrates a mechanism for handling the mirror chips and fixing the mirror chips 300 to mirror assembly substrate 15. As indicated earlier, the silicon wafer portion 200M of mirror chip 300 includes the highly polished surface 204. Also, mirror substrate 15 already has a polished surface 17 for subsequent fixing to block 10 via an optical contact. Thus, mirror chip 300 can be fixed to surface 17 of mirror assembly substrate 15 by the optical contact technique. Of course, other processes which can secure the mirror chips to the mirror assembly substrate 15 would also be acceptable.

Mirror chip 300 may be handled with a vacuum probe 410 as illustrated in FIG. 4. Probe 410 includes a port 450 through which a vacuum 452 may be applied. The probe can then accurately position mirror chip 300 on surface 17 of substrate 15. When properly positioned, a pressure 454 may be applied through port 450 to enhance optical contact of the surface 204 of mirror chip 300 to surface 17 of substrate 15. A rubber ring 460 may be placed between mirror chip 300 and vacuum probe 410 in order to provide proper suction and pressure without harming the mirror chip.

It should be recognized that the mirror chips, being such very thin members may require special handling techniques such as that illustrated in FIG. 4 for assembling the mirror chip 300 to a mirror substrate 15.

As was noted earlier with reference to FIG. 1, some substrates are purposely contoured to have a portion which has a large radius of curvature. Chip 300 may still be secured to substrate 15 via the technique illustrated since chip 300 is so thin. This is so since the chip, being so thin, will follow the contour of substrate 17.

As is well known in the art of ring laser angular rate sensors, one of the mirror assemblies is typically partially transmissive so that a portion of each of the counter-propagating laser beams within the block are allowed to pass through the partially transmissive mirror. These beam portions can then be optically directed in such a fashion to separately impinge upon individual photodetectors or be redirected via an optical prism in order to emerge misaligned with each other at a slight angle and impinge upon a photodetector. The latter being utilized to create an interference fringe pattern which the photodetector is responsive thereto.

Figure 5:
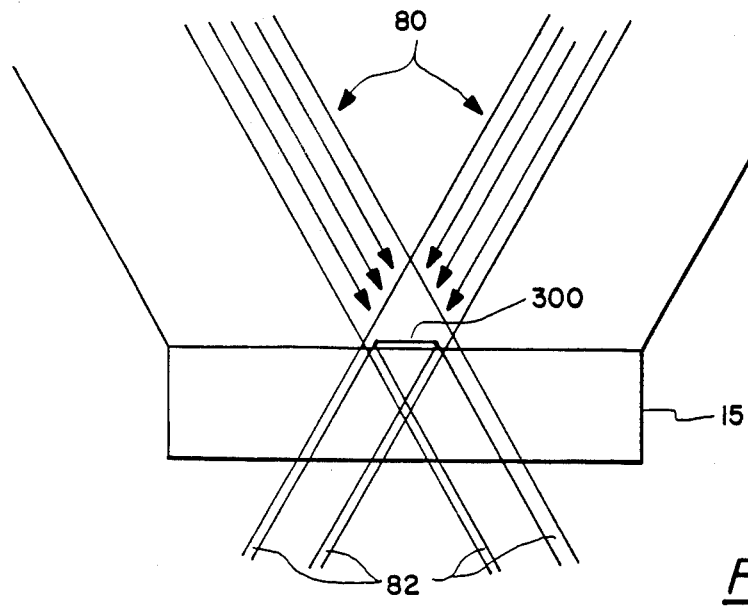
FIG. 5 illustrates a method of obtaining readout and control signal information with use of the mirror chip of the present invention.

FIG. 5 shows the use of a mirror assembly 300 in accordance with the present invention so as to provide the necessary output signals. Specifically, mirror chip 300 can be controlled in diameter to be substantially equal to the laser beams 80. This, of course, may be accomplished by laser trimming of the mirror chip 300. Chip 300 may then be accurately positioned on substrate 17. Substrate 17 may then be accurately positioned on block 10 such that energy leaking around the edges of the mirror chip can then be used for signal information similar to that provided by a partially transmissive mirror.

It should be noted that if the mirror chip substrate 200M is translucent then light may pass through the mirror coating and subsequently through a translucent mirror chip substrate and mirror assembly substrate toward a detector or optical prism. This may be accomplished, for example, by a mirror chip substrate (wafer) and mirror assembly substrate being both comprised of fused quartz, or the like.

Thus, the single mirror chip construction of the present invention may be used for either flat or curved mirrors and may also be used to obviate the need for a partially transmissive mirror to obtain readout information beam signals.

Further, the novel mirror construction reduces the overall cost of the sensor. This is so since if any mirror fails under test, only the mirror chip need be replaced. The mirror substrate is still reusable after minor cleaning and polishing. Unlike the prior art, the mirror substrate does not require the redoing of the ultra-high polishing step and mirror coating deposition.

Those skilled in the art will recognize that the preferred embodiment of the present invention has been disclosed herein and that the embodiment may be altered and modified without departing from the true spirit and scope of the invention as defined in the accompanying claims. Particularly, one or more layers of material which provide the mirror function is all that is needed to be within the scope of the present invention.

The embodiments of the invention in which an exclusive property or right is claimed are defined as follows:

1. A ring laser angular rate sensor comprising:
   a mechanically thermally stable block having a plurality of interconnecting tunnels; and
   a two substrate mirror assembly including, a first substrate having a first polished surface having portions thereof fixed to portions of said block;
   a second substrate having a first and a second oppositely disposed surfaces, said first surface bonded to said first surface of said first substrate; and
   a mirror material deposited on said second surface of said second substrate, said mirror material being in communication with at least a pair of said interconnecting tunnels.

2. The mirror assembly of claim 1 wherein said second substrate is comprised of said mirror material.

3. The mirror assembly of claim 1 wherein said first and second substrates are comprised of a translucent material.

4. A mirror assembly comprising:
   a first substrate having a first polished surface suitable for an optical contact seal to another surface;

a silicon substrate having a first polished surface and an oppositely disposed second surface, said first polished surfaces of said first substrate and said silicon substrate being suitably polished to permit bonding together said first surfaces of said first substrate and said silicon substrate by an optical contact seal; and a mirror material on said second surface of said silicon substrate to form a mirror.

5. A mirror assembly comprising:

a first substratde having a first polished surface suitable for an optical contact seal to another surface;

a silicon substrate having a first polished surface and an oppositely disposed second surface, said first polished surfaces of said first substrate and said silicon substrate being suitably polished to permit bonding together siad first surfaces of said first substrate and said silicon substrate by an optical contact seal; and a mirror comprised of a plurality of alternating layers of a dielectric material on said second surface of said silicon substrate to form a highly reflective mirror.

6. The mirror assembly of claim 5 wherein said alternating layers are layers of silicon dioxide and titanium diode.

7. A ring laser angular rate sensor comprising:

a mechanically thermally stable block having a plurality of interconnecting tunnels; and a mirror assembly having,
    a first substrate having a first polished surface suitable for an optical contact seal to another surface;
    a silicon substrate having a first polished surface and an oppositely disposed second surface, said first polished surfaces of said first substrate and said silicon substrate being suitably polished to permit bonding together said first surfaces of said first substrate and said silicon substrate by an optical contact seal; and
    a mirror material on said second surface of said silicon substrate to form a mirror.

8. The ring laser angular rate sensor of claim 7 wherein:

said first polished surface of said first substrate is sealed to portions of said block; and said mirror material on said second surface of said silicon substrate is in communication with a pair of said interconnecting tunnels.

9. A ring laser angular rate sensor comprising:

a mechanically thermally stable block having a plurality of interconnecting tunnels; and a mirror assembly having,
    a first substrate having a first polished surface suitable for an optical contact seal to another surface;
    a silicon substrate having a first polished surface and an oppositely disposed second surface, siad first polished surfaces of said first substrate and said silicon substrate being suitably polished to permit bonding together said first surfaces of said first substrate and said silicon substrate by an optical contact seal; and
    a mirror comprised of a plurality of alternating layers of a dielectric material on said second surface of said silicon substrate to form a highly reflective mirror.

10. The mirror assembly of claim 9 wherein said alternating layers are layers of silicon dioxide and titanium diode.

11. The ring laser angular rate sensor of claim 9 wherein:

said first polished surface of siad first substrate is sealed to portions of said block; and said mirror material on said second surface of said silicon substrate is in communication with a pair of said interconnecting tunnels.

12. A ring laser angular rate sensor comprising:

a mechanically thermally stable block having a plurality of interconnecting tunnels; and a mirror assembly having,
    a first substrate having a first polished surface suitable for an optical contact seal, said first substrate secured to portions of said block by an optical contact seal;
    a second substrate having a first polished surface suitable for an optical contact seal, and an oppositely disposed second surface, said first polished surface of said second substrate secured to a portion of said first surface of said first substrate by an optical contact seal; and
    a mirror material on said second surface of said second substrate to form a mirror, said mirror material being in communication with a pair of said interconnecting tunnels.

* * * * *